United States Patent [19]

Lukes

[11] Patent Number: 5,171,186

[45] Date of Patent: Dec. 15, 1992

[54] METHOD OF MANUFACTURE OF A LONG POINT DRILL SCREW

[75] Inventor: Richard W. Lukes, Calmar, Iowa

[73] Assignee: Textron Inc., Providence, R.I.

[21] Appl. No.: 681,121

[22] Filed: Apr. 5, 1991

[51] Int. Cl.$^5$ ............................................. B12H 3/02
[52] U.S. Cl. ........................................ 470/9; 411/387
[58] Field of Search ................ 411/387, 386; 470/8, 470/9, 58, 65

[56] References Cited

U.S. PATENT DOCUMENTS

| | | | |
|---|---|---|---|
| 3,345,603 | 8/1968 | Skierski | 10/10 R |
| 3,463,045 | 8/1969 | Prescott | 10/10 R |
| 3,550,255 | 12/1970 | Skierski | 10/10 R |
| 3,683,436 | 8/1972 | Reiland | 10/10 R |
| 3,747,143 | 7/1973 | Eager | 10/10 R |
| 4,016,795 | 4/1977 | Gill | 10/10 R |
| 4,147,088 | 4/1979 | Whittaker, Jr. | 10/10 R |
| 4,241,639 | 12/1980 | Baer . | |
| 4,583,898 | 4/1986 | Sygnator | 411/387 |

Primary Examiner—Lowell A. Larson
Assistant Examiner—Michael J. McKeon
Attorney, Agent, or Firm—Trexler, Bushnell, Giangiorgi & Blackstone, Ltd.

[57] ABSTRACT

A method for forming a self-drilling screw. The self-drilling screw formed by this method stabilizes the screw during the hole drilling step of driving the screw and produces a precisely dimensioned hole for receiving the threaded portion of the screw. The method of forming the self-drilling screw starts with providing a screw blank having a head end and a tip. A driving head is formed on the head end and a drilling portion is formed on the shank distal the head end. Two longitudinally extending flutes are formed on the drilling portion of shank from the tip towards the head end. Each flute includes a working edge and a formed trailing edge. The working edges and the formed trailing edges of the two flutes are respectively diametrically opposed on the shank. A formed trailing diameter measured across the diametrically opposed formed trailing edges is greater than a working diameter measured across the diametrically opposed working edges. Next, the drilling portion is rolled between two oppositely moving complementary rolling dies for rolling the formed trailing edges inwardly. Rolling the formed trailing edges on the drilling portion forms rolled trailing edges. After rolling the drilling portion, a rolled trailing diameter measured across the rolled trailing edges substantially equals the working diameter. Finally, thread are formed on the shank generally between the head end and drilling portion.

15 Claims, 2 Drawing Sheets

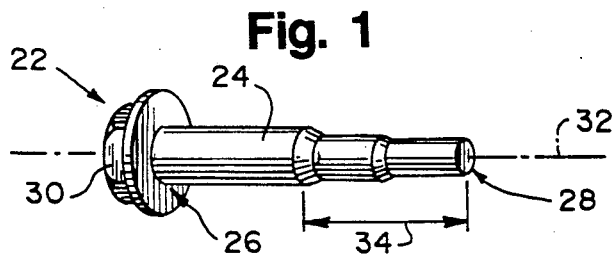
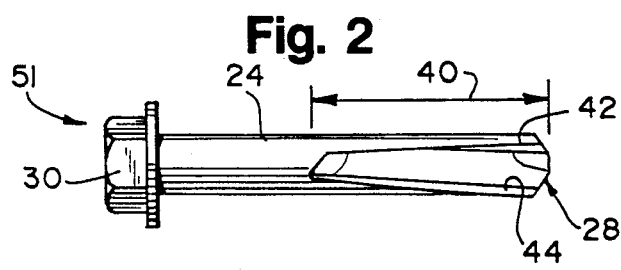
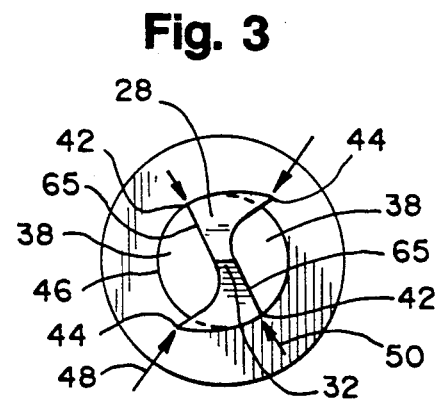
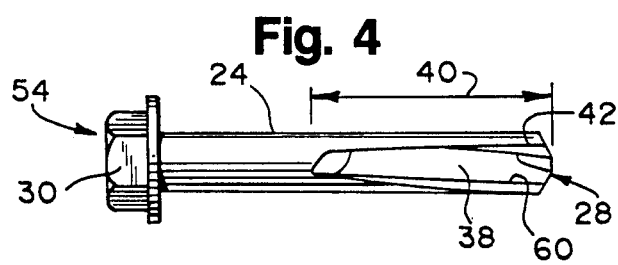
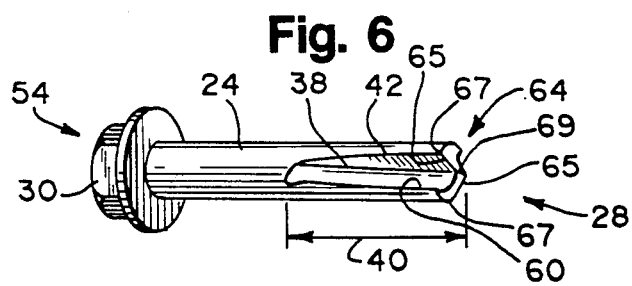
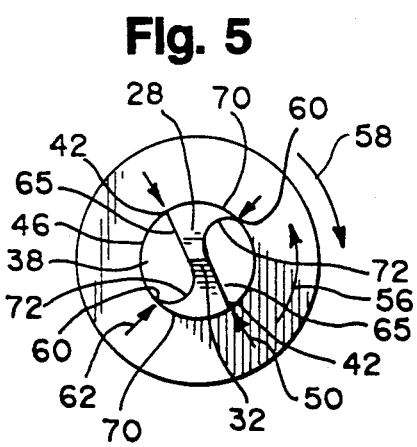
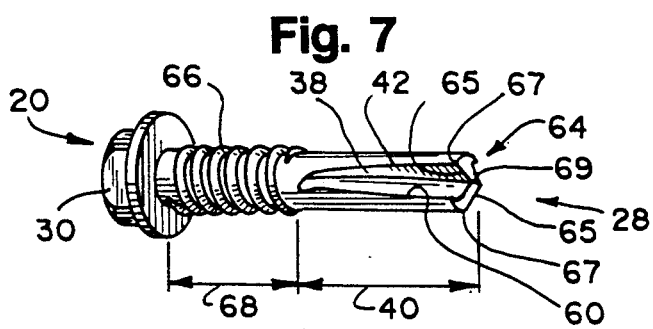

METHOD OF MANUFACTURE OF A LONG POINT DRILL SCREW

BACKGROUND OF THE INVENTION

The present invention relates to long point self-drilling screws and the method of making such screws.

Long point drill screws or self-drilling screws have many advantages in applicable situations. Self-drilling screws eliminating the need to drill a hole prior to driving a screw thereby eliminating the labor and tooling inherent in a drill before driving operation. While the additional step of drilling is eliminated by such a screw, the hole drilled by the self-drilling screw must be highly accurate to prevent undesirable results.

For example, if the drilled hole is too large, there will not be sufficient material for proper thread engagement. Depending on the degree of enlargement of the hole, it is possible that the screw may strip out of the workpiece. Clearly, it is undesirable to have screws stripping out of workpieces. Further, if the drilled hole is too small, the threads are forced to form or cut through too much material and may result in torsional failure or "snapping-off" of the screw. If the screw snaps-off in the drilled hole, the shank of the screw must be drilled out and a new screw inserted therein. Correction of a snapped-off screw is very time consuming and may not be possible depending on the circumstances.

Further, it is desirable to form a self-drilling screw through a cold-working process as opposed to a cutting process. A screw formed through a cutting process will not maximize the benefits of the grain structure inherent in the screw blank metal. In contrast, a cold-formed screw maintains the grain structure and cold works the material thereby maximizing the structural benefits of the material. Additionally, cold-forming the screw eliminates the additional machining processes, cutting tooling and scrap material of a typical cutting process.

An example of a method and apparatus for producing drill screws is shown in U.S. Pat. No. 4,241,639 to Baer. The method and apparatus as shown in Baer produces a self-drilling screw by a method employing numerous cutting operations. As shown in Baer, the cutting operations are relatively complex and requires numerous pieces of precision positioning and cutting equipment. Further, the product resulting from the process as shown in Baer is a screw in which the inherent material strength is not maximized as a result of the cutting process.

A common problem with self-drilling screws, especially when the drilling portion of the screw is rather long, is that the screw tends to drill an oversized hole. An oversized hole is formed by a long point self-drilling screw when the drilling portion is not substantially straight. A drilling portion which is not substantially straight will tend to wobble while the screw is driven producing an elliptical or bell-mouthed hole or both. Such an irregular hole typically will not meet required tolerances for satisfactory thread forming and engagement thereby increasing the possibility of the screw stripping-out of the workpiece.

In an attempt to control irregularly shaped holes, screw manufacturers formed the drill portion with a working edge as previously formed and a trailing edge of the drilling portion which was slightly relieved from the circumference of the shank. An example of such a prior art self-drilling screw is provided in FIGS. 8 and 9. As illustrated in FIGS. 8 and 9, a flute is formed in the shank of a screw with a working edge and a trailing edge. A working edge which is not substantially straight tends to gouge the hole unless the trailing edge is relieved from the circumference of the shank (see FIG. 9) to compensate for the irregularity of the shank.

The resulting drilling portion of the screw is not round since the relieved trailing edge has a diameter which is slightly smaller than the working edge. As a result, this type of screw tends to be unstable and wobble when driven because only the two working edges contact the material while the screw is driven. Therefore, the apparent solution to the problem created by an irregular drilling portion created another problem producing essentially the same undesirable results.

SUMMARY OF THE INVENTION

A general object of the present invention is to provide a cold-formed long point drill screw which precisely drills a hole of a predetermined desired dimension.

Another general object of the present invention is to provide a method of cold-forming a long point drill screw to produce a screw having a substantially straight drill portion which will drill a precise hole of a predetermined desired dimension.

A general object of the present invention is to provide a method of cold-forming a long point drill screw by forming a working edge and a formed trailing edge thereon and rolling the formed trailing edge to form a rolled trailing edge which promotes the formation of a substantially straight drilling portion to maintain a desired drilling tolerance.

Yet another object of the present invention is to provide a long point drill screw which prevents the screw from wobbling while the screw is being driven into a workpiece.

Briefly, and in accordance with the following, the present invention includes a long point drill screw and method for forming such a drill screw. The drill screw formed by this method stabilizes the screw during the hole drilling portion of driving the screw and produces a precisely dimensioned hole for receiving the threaded portion of the screw. The method of forming the drill screw starts with providing a screw blank having a head end and a tip. A driving head is formed on the head end and a drilling portion is formed on the shank distal the head end. Two flutes are formed on the drilling portion longitudinally extend along the shank from the tip towards the head end. Each flute includes a working edge and a formed trailing edge. The working edges and the formed trailing edges of the two flutes are respectively diametrically opposed on the shank. A formed trailing diameter measured across the diametrically opposed formed trailing edges is greater than a working diameter measured across the diametrically opposed working edges. Next, the drilling portion is rolled between two oppositely moving complimentary rolling dies for rolling the formed trailing edges inwardly. Rolling the formed trailing edges on the drilling portion forms rolled trailing edges. After rolling the drilling portion a rolled trailing diameter measured across the rolled trailing edges substantially equals the working diameter. Finally, threads are formed on the shank generally between the head end and drilling portion.

BRIEF DESCRIPTION OF THE DRAWINGS

The organization and manner of the operation of the invention, together with the further objects and advantages thereof, may be understood by reference to the following description taken in connection with the accompanying drawings in which like reference numerals identify like elements, and in which:

FIG. 1 is a perspective view of a screw blank having a headed end and a tapered shank from which a long point self-drilling screw of the present invention is formed;

FIG. 2 is a side elevational view of the blank as illustrated in FIG. 1 after two flutes have been formed in a drilling portion of the shank;

FIG. 3 is an enlarged end view of the blank as illustrated in FIG. 2 showing the two flutes formed in the shank and trailing edges of the flutes which extend beyond a circumference of the shank;

FIG. 4 is a side elevational view of the blank as illustrated in FIG. 2 in which the formed trailing edges have been rolled inwardly;

FIG. 5 is an enlarged end view of the blank as illustrated in FIG. 4 showing the flutes after the formed trailing edges have been rolled inwardly within the circumference of the shank forming rolled trailing edges;

FIG. 6 is a perspective view of the blank as illustrated in FIG. 4 after a chisel point has been formed on a tip of the shank;

FIG. 7 is a perspective view of the blank as illustrated in FIG. 6 after threads have been formed on the shank generally between the head end and the drilling portion;

DESCRIPTION OF THE ILLUSTRATED EMBODIMENT

Figure 8:
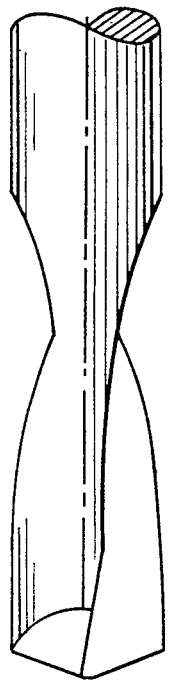
FIG. 8 is an enlarged fragmentary view of the drilling portion of a prior art drill screw

While this invention may be susceptible to embodiment in different forms, there is shown in the drawings and will be described herein in detail, a preferred embodiment of the present invention with the understanding that the present disclosure is to be considered an exemplification of the principles of the invention and is not intended to limit the invention to the embodiment illustrated and described herein below.

It should be noted that dimensional relationships between members of the illustrated embodiment may vary in practice or may have been varied in the illustrations to emphasize certain features of the invention.

Figure 10:
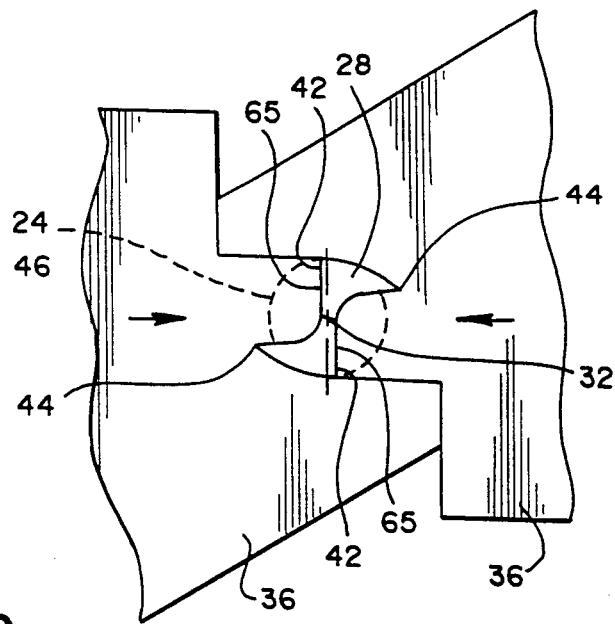
FIG. 10 is an end view of the blank as illustrated in FIGS. 2 and 3 during the process in which the flutes are formed on the drilling portion by complementary cold forging dies.
Figure 9:
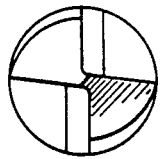
FIG. 9 is an end view of the prior art drill screw as illustrated in FIG. 8.

FIGS. 1-7 provide a series of progressions by which a long point drill screw or screw 20 of the present invention is formed. The method of forming the screw 20 starts with a screw blank 22 as shown in FIG. 1. The screw blank 22 has an elongated shank 24 with a head end 26 and a work entering end or tip end 28. A driving head 30 is formed on the head end 26 and a longitudinal axis 32 extends through the elongated shank 24. The elongated shank 24 may be formed with a tapered portion 34 to reduce the amount of material which is deformed in the forging step illustrated in FIG. 10.

With reference to the side view as illustrated in FIG. 2 and the end view as illustrated in FIG. 3, the screw blank 22 is forged between two complimentary forging dies 36 (see FIG. 10) to form two diametrically opposed elongated flutes 38 included on a drilling portion 40 on the shank 24. The elongated flutes 38 longitudinally extend from the tip end 28 towards the head end 26 generally parallel to the longitudinal axis 32.

As shown in FIG. 3, the flutes 38 include longitudinally disposed working edges 42 and formed trailing edges 44. The formed trailing edges 44 are formed extending beyond a circumference 46 of the shank 24 while the working edges 42 are formed within the circumference 46. Both the working edges 42 and the formed trailing edges 44 are generally parallel to the longitudinal axis 32 but tend to taper slightly inwardly. A formed edge diameter 48 measured across the formed trailing edges 44, 44 is greater than a working edge diameter 50 measured across the working edges 42, 42. In other words the trailing edges are formed to a diameter which exceeds a desired final diameter for the elongate drilling portion.

In the next step of forming the screw 20 as shown in FIG. 7, the formed fluted drilling portion 40 is rolled to reform the trailing edge 44 of each flute 38 into the circumference 46 of said drilling portion 40 to a predetermined precise uniform diameter. The formed shank 51 is rolled between two complimentary precision rolling dies 52 to produce a rolled shank 54 as illustrated in FIGS. 4 and 5. As illustrated in FIG. 5, the formed blank 51 has a drilling direction of rotation as indicated by arrow 56 and is rolled between the complementary rolling dies 52 in a direction indicated by arrow 58 during the rolling step illustrated in FIG. 11. The rolling direction 58 is opposite to the drilling direction 56 so that the formed trailing edges 44 may be rolled into rolled trailing edges 60.

Figure 11:
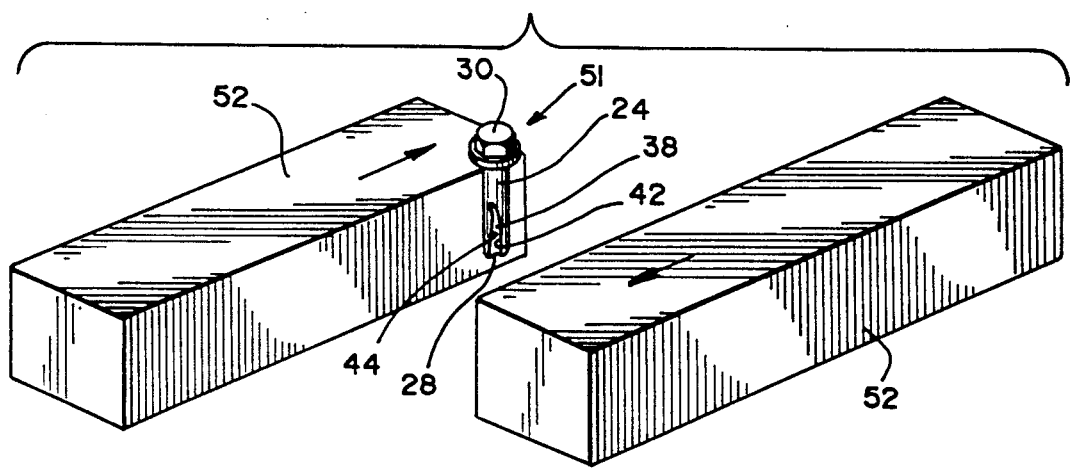
FIG. 11 is a perspective view of oppositely moving complementary rolling dies used to roll the formed trailing edges into rolled trailing edges within the circumference of the shank.

After rolling the formed trailing edges 44 into rolled trailing edges 60, a rolled edge diameter 62 measured across the rolled trailing edges 60, 60 is substantially equal to the working edge diameter 50 measured across the drilling edges 42, 42. The rolling step as shown in FIG. 11 produces a substantially straight shank 24 as well as working and rolled trailing edges 42, 60 which are within the circumference 46 of the shank 24. Therefore, the entire shank 24, extending from the head end 26 through the drilling portion 40 to the tip 28, is substantially straight after the rolling process. Further, the rolled trailing edges 60 have a characteristic double curved shape. More specifically, the rolled trailing edges 60 have a convex portion 70 following the circumference 46 of the shank 24 and a concave portion 72 formed inside the circumference 46.

Because the rolled trailing edges 60 follow the circumference 46 of the shank 24, the rolled trailing edges 60 provide stabilizing support thereby effectively eliminating screw wobble when the screw 20 is driven. Since wobble is effectively eliminated, the screw 20 may be formed to desired dimensions without relieving the trailing edge to compensate for wobble induced gouging or other hole eccentricities. Forming the screw 20 to drill a hole having predetermined desired dimensions substantially reduces strip-out or torsional failure due to a hole which is too large or small.

FIG. 6 illustrates the next step in forming the screw 20. In FIG. 6, the tip 28 (as shown in FIGS. 2 and 4) is cut to form a drilling point 64. The drilling point 64 includes a pair cutting edges 65 formed at a terminal end 67 of each of the working edges 42 of each of the flutes 38 and extends from a point where the working edge 42 meets the circumference 42 at the terminal end 67 inwardly non-coincidentally toward a longitudinal axis of said shank. A chisel point 69 is formed extending between the cutting edges 65. The chisel point 69 and the cutting edges 65 perform the cutting operation of the drilling step. The cutting edges 65, 65 formed on the tip 28 are substantially diametrically opposed thereby further enhancing the stability of the screw while it is driven. The drilling point 64 is cut on the tip 28 after the rolling step to prevent distortion of the chisel point 64 during the forming steps.

Finally, threads 66 comprising a threaded portion 68 are formed generally between the drilling portion 40 and the driving head 30. In some circumstances the threads 66 may be formed to partially overlap the drilling portion 40. The threads 66 are sized and dimensioned in order to produce a desired engaging effect with a workpiece.

While a preferred embodiment of the present invention is shown and described, it is envisioned that those skilled in the art may devise various modifications of the present invention without departing from the spirit and scope of the appended claims.

The invention is claimed as follows:

1. A method of forming a self-drilling screw of the type including a shank portion having a driving head at one end, an elongate drilling portion at the other, a work entering end of said drilling portion includes a drill tip, with a threaded portion formed between said drill tip and said driving head, said drilling portion including a pair of elongate flutes formed in said shank, said drill tip includes a pair of oppositely disposed cutting edges defined partially by the terminal portions of said flutes, each of said flutes including a longitudinally disposed working edge and a corresponding trailing edge, said method of forming the self-drilling screw comprising the steps of:

providing a screw blank having a headed end and a tip end;

compressively forming a pair of flutes proximate to the tip end of said blank in the area of said drilling portion, each flute including a longitudinally extending working edge and trailing edge, said step of forming said flutes including the step of forming said trailing edges to a diameter in excess of a desired final diameter for said elongate drilling portion;

rolling said previously formed fluted drilling portion to reform said trailing edge of each flute and a circumferential surface of said drilling portion to a predetermined precise circular configuration having a uniform diameter;

forming the tip end of said blank to define said cutting edges; and forming threads on said shank intermediate said driving head and said drilling portion.

2. A method of forming a self-drilling screw according to claim 1 further including the step of rolling said drilling portion between two oppositely disposed rolling dies.

3. A method of forming a self-drilling screw according to claim 1 further including the step of fabricating a drilling point on said tip end of said drilling portion.

4. A method of forming a self-drilling screw according to claim 1 further including the step of cold forming said threads.

5. A method of forming a self-drilling screw according to claim 1 wherein the step of rolling said drilling portion forms a trailing edge having a convex outside surface and a concave inside surface.

6. A self-drilling screw formed in accordance with the method of claim 5.

7. A method of cold forming a self-drilling screw, said method comprising the following step:

providing a screw blank having a headed end and a tip end;

compressively forming an elongated drilling portion on said shank, said elongated drilling portion including two elongated flutes longitudinally extending along a substantial dimension of said shank from said tip end towards said headed end, each of said flutes including a working end and a formed trailing edge;

said forming step including the step of forming said formed trailing edge to a diameter in excess of a desired final diameter for said elongated drilling portion; and rolling said elongated drilling portion between two oppositely moving complimentary rolling dies for rolling said formed trailing edge inwardly thereby forming said rolled trailing edge to a circular configuration having a diameter substantially equal to a desired final diameter for said elongated drilling portion.

8. A method of forming a self-drilling screw according to claim 7 further including the step of forming threads on said shank between said headed end and said tip end.

9. A method of forming a self-drilling screw according to claim 8 further including the step of rolling said drilling portion for forming said rolling trailing edge and simultaneously forming said threads between said headed end and said tip end.

10. A method of forming a self-drilling screw according to claim 7 further including the step of forming two cutting edges on said tip end, each of said cutting edges being disposed on said tip end and extending from a terminal end of said working edge of each of said flutes inwardly towards and offset from a longitudinal axis of said shank.

11. A method of forming a self-drilling screw according to claim 10 further including the step of forming a chisel point extending between said cutting edges.

12. A method of forming a self-drilling screw according to claim 7 further including using a pair of complimentary die members for cold forming said two flutes on said drilling portion.

13. A method of forming a self-drilling screw according to claim 7 further including providing a double tapered shank on said blank from which said screw is formed, said double tapered shank reducing the amount of material deformed during the step of forming said flutes and the amount of material which is rolled during the rolling step.

14. A method of forming a self-drilling screw according to claim 7 wherein the step of rolling said drilling portion forms a trailing edge having a convex outside surface and a concave inside surface.

15. A self-drilling screw formed in accordance with the method of claim 14.

* * * * *